US005763052A

United States Patent [19]

Carr

[11] Patent Number: 5,763,052

[45] Date of Patent: Jun. 9, 1998

[54] INFORMATIONAL ARTICLE AND AN ASSOCIATED METHOD

[75] Inventor: Michael S. Carr, Pine Junction, Colo.

[73] Assignee: Optical Security Group, Inc., Denver, Colo.

[21] Appl. No.: 517,947

[22] Filed: Aug. 22, 1995

[51] Int. Cl.[6] .................................................. B32B 3/00

[52] U.S. Cl. ..................... 428/195; 428/204; 428/411.1; 428/448; 428/484; 428/488.4; 428/688; 283/72

[58] Field of Search .............................. 478/195, 204, 478/411.1, 913, 914, 343, 488.4, 448, 484, 486.4, 688; 156/247; 283/72

[56] References Cited

U.S. PATENT DOCUMENTS

| | | | |
|---|---|---|---|
| 4,017,994 | 4/1977 | Fraser | 40/2.2 |
| 4,246,307 | 1/1981 | Trautwein . | |
| 4,324,421 | 4/1982 | Moraw et al. . | |
| 4,429,015 | 1/1984 | Sheptak . | |
| 4,627,642 | 12/1986 | Peronneau et al. . | |
| 4,837,061 | 6/1989 | Smits et al. | 428/40 |
| 5,077,001 | 12/1991 | Makowka | 383/5 |
| 5,120,383 | 6/1992 | Takei et al. . | |
| 5,370,763 | 12/1994 | Curiel . | |
| 5,413,234 | 5/1995 | Hekal et al. | 215/230 |
| 5,489,123 | 2/1996 | Roshkoff | 283/81 |

*Primary Examiner*—William Krynski
*Attorney, Agent, or Firm*—David V. Radack; Eckert Seamans Cherin & Mellott, LLC

[57] ABSTRACT

An informational article having a separation control material disposed on a portion of the surface of the article and an information receiving layer overlying at least a portion of the separation control material and a portion of the surface. The information receiving layer is adapted to receive information thereon. A transparent tape is adhesively bonded to the information receiving layer containing the information. The transparent tape is more strongly adhered to the information receiving layer than the information receiving layer is adhered to the separation control material. In this way, removal of the transparent tape from the article removes both (i) the information receiving layer and (ii) the information overlying the separation control material from the remainder of the information receiving layer and the information. Because of this, evidence of tampering is easily, visually, detectable. An associated method is also disclosed.

13 Claims, 3 Drawing Sheets

INFORMATIONAL ARTICLE AND AN ASSOCIATED METHOD

BACKGROUND OF THE INVENTION

This invention relates to an informational article and an associated method, and more particularly to an informational article that is alteration and duplication resistant as well as having a tamper evident indicating feature.

Counterfeiting and alteration of articles with the intent to deceive third parties is, unfortunately, a problem in today's society. Among such articles are identification cards, credit cards, temporary vehicle registrations and placards of all kinds. Unauthorized alteration of such articles costs businesses and governments huge amounts of money while at the same time undermining the faith of honest people in the integrity of such articles.

If variable information, such as an expiration date, is written or printed on a substrate, for example a license plate, dishonest persons can merely remove the old information using a swab and a solvent and then merely write new information in place of the old. Even if a laminate or adhesive tape is used to cover the information, the dishonest person can either write on top of the tape to alter the information (e.g., changing a "3" to an "8") or can peel the tape, with the information being peeled along with the tape, leaving a blank space within which to write the new information.

What is needed, therefore, is a tamper evident informational article which cannot be effectively duplicated and which will resist alteration. The information entered on the tamper evident informational article should be destroyed upon tampering and evidence of tampering should be easily, visually detectable. The tamper evident informational article should be easy to use and relatively inexpensive.

SUMMARY OF THE INVENTION

The invention has met or exceeded the above-mentioned needs as well as others. The informational article comprises a separation control material disposed on a portion of the surface of the article and an information receiving layer overlying at least a portion of the separation control material and a portion of the surface of the informational article. The information receiving layer is adapted to receive information thereon. A transparent tape is adhesively bonded to the information receiving layer containing the information. The transparent tape is more strongly adhered to the information receiving layer than the information receiving layer is adhered to the separation control material. In this way, removal of the transparent tape from the article removes both (i) the information receiving layer and (ii) the information overlying the separation control material from the remainder of the information receiving layer and the information, whereby evidence of tampering is visually detectable.

The method of the invention comprises providing an information article having disposed on a surface thereof a separation control material with an information receiving layer overlying at least a portion of the separation control material and a portion of the surface of the informational article. The method then comprises, placing information on the information receiving layer and securing a transparent tape over the information receiving layer containing the information. The transparent tape is more strongly adhered to the information receiving layer than the information receiving layer is adhered to the separation control material. In this way, removal of the transparent tape from the article removes both (i) the information receiving layer and (ii) the information overlying the separation control material from the remainder of the information receiving layer and the information, whereby evidence of tampering is easily, visually detectable.

BRIEF DESCRIPTION OF THE DRAWINGS

A full understanding of the invention can be gained from the following detailed description of the invention when read in conjunction with the accompanying drawings in which.

DETAILED DESCRIPTION

The invention is useful in resisting unauthorized duplication and alteration of informational articles as well as providing visually detectable evidence of tampering. As used herein, the term "informational article" means an article or portion thereof which is intended to impart information and will expressly include, but not be limited to, parking and handicap placards, identification cards, security signs, labels, cards, checks, bank drafts, money orders, temporary vehicle registration certificates and plates and other types of informational signs, labels and cards. The invention is especially useful for protecting plastic, metal, non-fibrous or tightly bound fibrous substrates such as plastic vehicle hang tags, license plates, handicap and parking placards and the like. Heretofore, the information on these substrates could be easily removed with a solvent and new information written in place of the old. Even providing a laminate or transparent tape over the information was not effective because of the ease in peeling the tape. Furthermore, the adhesive on the tape would lift the printed information off of the substrate so that new information could be placed on the substrate in place of the old.

Figure 1:
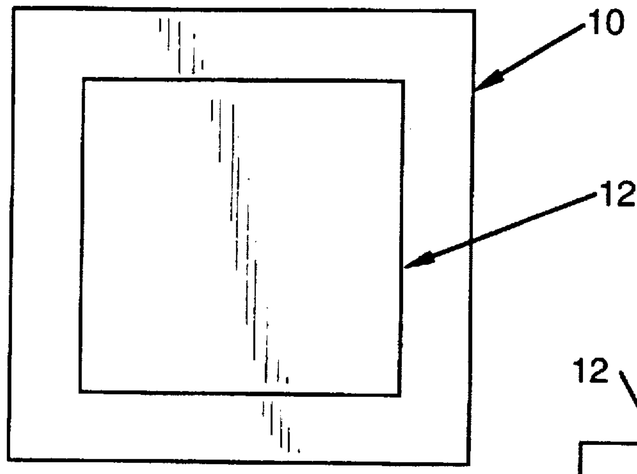
FIG. 1 is an elevational view of a substrate having a zone to be protected.

Referring to FIG. 1, a portion of a plastic substrate 10 having a zone to be protected 12 is shown. The plastic substrate 10 can be, for example, a parking placard that is adapted to hang from an automobile rear view mirror. Variable information, such as an expiration date, needs to be entered into the zone to be protected 12. The invention is designed to resist unauthorized duplication of the entire hang tag and unauthorized alteration of the information printed thereon, such as changing the expiration date as well as provide a visually detectable indication that tampering with the informational article has occurred.

As used herein, a reference to "zone" to be protected will generally refer to a region of the substrate 10 within which a certain portion is to be protected against alteration, such as the square region shown in FIG. 1 which includes the variable information to be inserted, as will be discussed below. While the zone may not have specific physical boundaries, it will generally be preferable to have it include, at minimum, the entire variable information sought to be protected. In some instances, a substrate may have a number of individual zones to be protected or the zone may be coextensive with the substrate.

Figure 2:
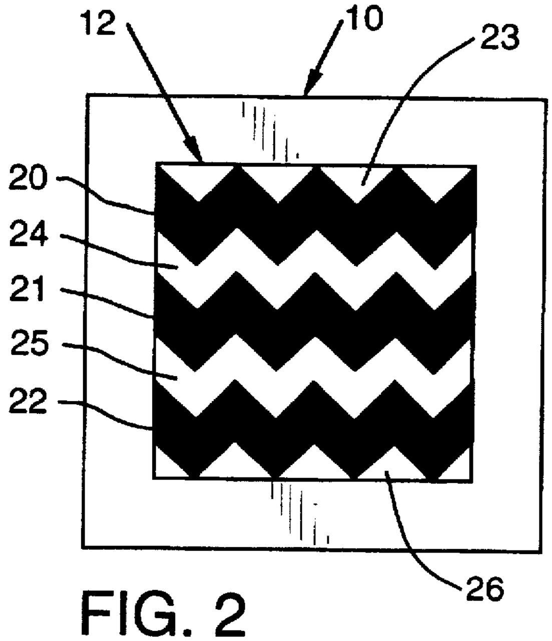
FIG. 2 is a view similar to the view of FIG. 1 only showing the separation control material thereon.

Referring now to FIGS. 2–6, the structure of an embodiment of the invention will be discussed. FIG. 2 shows separation control materials 20, 21 and 22 placed on the substrate 10 in some desired predetermined pattern, such as the zig-zag pattern shown. As used herein, the term "separation control material" is a material which is applied to a substrate and which has an information receiving layer applied thereon, the separation control material functioning to allow removal of the information receiving layer without the separation control material being completely removed from the substrate. The zone to be protected 12, thus includes the separation control material 20–22 and areas of bare substrate, such as areas 23, 24, 25 and 26. The pattern could take any number of forms, including, but not limited to, other patterns, words or other geometric shapes. The material used for the separation control material is preferably dimethyl silicone and can also include alkyl modified silicone fluids, paraffins and tetrafluoroethylene. The separation control material can be applied using known zone coating techniques or can even be printed by any of a variety of commonly used printing techniques, such as rotary screen printing, flexographic printing, screen printing, off-set, and rotogravure. Preferably the coating of separation control material is about 5 to 50 microns thick with 10 to 25 microns being preferred.

Figure 3:
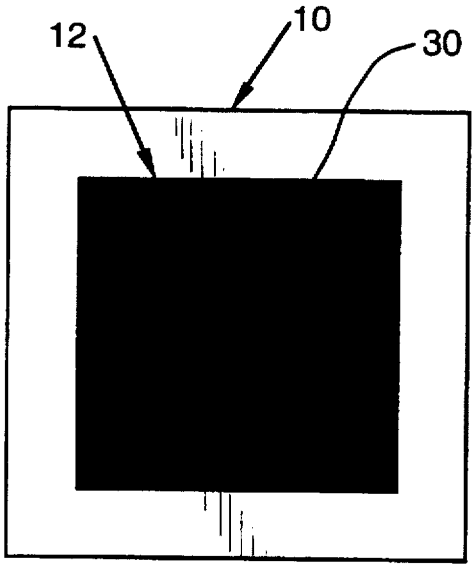
FIG. 3 is an elevational view of the informational article having the information receiving layer printed over the zone to be protected.

Once the separation control materials 20, 21, 22 are placed on the substrate, an information receiving layer 30 is printed over the separation control material 20 and the bare substrate areas 23–26 in the zone to be protected 12 as is shown in FIG. 3. The information receiving layer 30, also referred to herein as the background overprint, receives information thereon. The background overprint 30 is preferably an opaque ink that will absorb at least some of the material used for marking information thereon. A suitable solid ink is made by Sericol of Kansas City, Kans. and sold under the trade designation of "PC" or "MR".

The background overprint 30 can be applied to a thickness of 5 to 50 microns with 10 to 25 microns being preferred. It is also preferred that the background overprint be a contrasting color to the substrate 10, although this is not necessary for the invention to perform its essential function. For example, the zone to be protected 12 could be black whereas the background overprint 30 could be white. The significance and purpose of the contrasting colors will be explained below with respect to FIG. 7. Furthermore, the background overprint 30 can be a multi-color logo or a pattern that could appear to reverse if a portion were removed. The significance of the removal of a portion of the background overprint 30 will become clear after the discussion of FIGS. 5, 6, 8 and 9 below.

Figure 4:
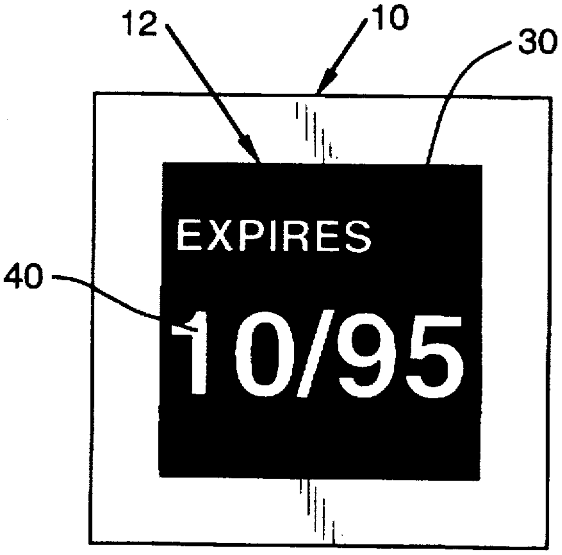
FIG. 4 is a view similar to FIG. 3 showing the variable information printed on the background overprint.

Referring now to FIG. 4, variable information, such as an expiration date 40 is then inserted on the information receiving layer 30. The variable information 40 can be entered manually, as by using a marker, or can be printed thereon. It is preferred to use a marking or printing material, such as a non-washable ink, that is absorbed either partially or completely into the background overprint 30 (see FIG. 6 discussed below). The ink can be applied by any known means, such as by a permanent ink marker.

Figure 5:
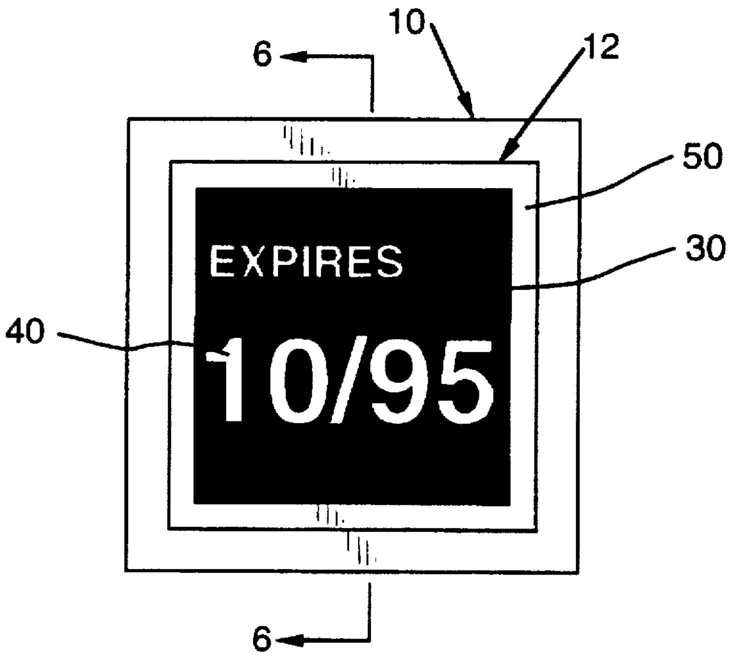
FIG. 5 is a view similar to FIG. 4 only showing the transparent tape adhered onto the informational article.

Once the information is inserted into the background overprint 30, the zone to be protected 12 along with the variable information 40 is covered with a transparent tape 50 as is shown in FIG. 5. As shown in FIG. 5, the transparent tape 50 is larger in area than the zone to be protected 12. The transparent tape 50 must be at least large enough to cover the variable information 40 entered onto the background overprint 30.

Figure 6:
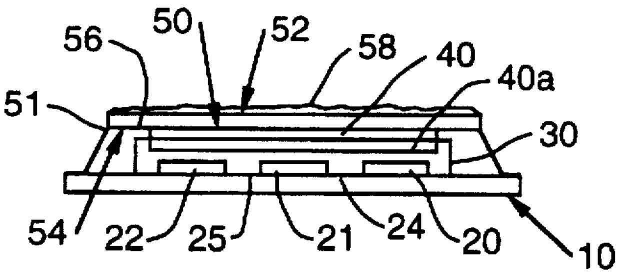
FIG. 6 is a cross-sectional view taken along line 6—6 of FIG. 5.

Referring now to FIG. 6 which shows a greatly exaggerated sectional view through line 6—6 of FIG. 5, it can be seen that the transparent tape 50 consists of a face stock 51 and a pressure sensitive adhesive layer 54. The face stock has an exposed surface 52 and an undersurface 56. The pressure sensitive adhesive layer 54 is disposed on the undersurface 56 of the face stock 51 and promotes affixation of the tape 50 to the background overprint 30 and the substrate 10. A suitable pressure sensitive adhesive tape is be made by Avery Dennison Specialty Tape Division of Painesville, Ohio and sold under the trade designation of FasTape. The exposed surface 52 has disposed thereon a layer 58 that is preferably write resistant and ink repellant in order to resist alteration of the variable information by, for example, changing a "3" to an "8". The write resisting layer 58 consists of a silicone resin and a wax toughening agent. The preferred silicone resin is a curable resin, which can be heat, E-beam or ultraviolet curable. Preferably, the silicone is an E-beam cured polydimethylsiloxane and the wax toughening agent is polytetrafluoroethylene. The face stock 51 is preferably about 10 to 100 microns and most preferably about 25 to 50 microns thick while the write resisting layer 58 is preferably about 10 to 30 microns in thickness and the pressure sensitive adhesive layer 54 is preferably about 10 to 100 microns and most preferably about 25 to 50 microns in thickness.

It will be appreciated that the transparent tape 50 can be provided as a separate member or can be presecured to the informational article, as was taught in U.S. Pat. No. 5,370,763, the disclosure of which is incorporated herein by reference.

As can be seen in FIG. 6, the ink used to print the variable information 40 is absorbed into the background overprint 30, as shown by reference number **40*a*. As will be explained below, this will facilitate identifying whether or not tampering with the informational article 10** has occurred.

Figure 7:
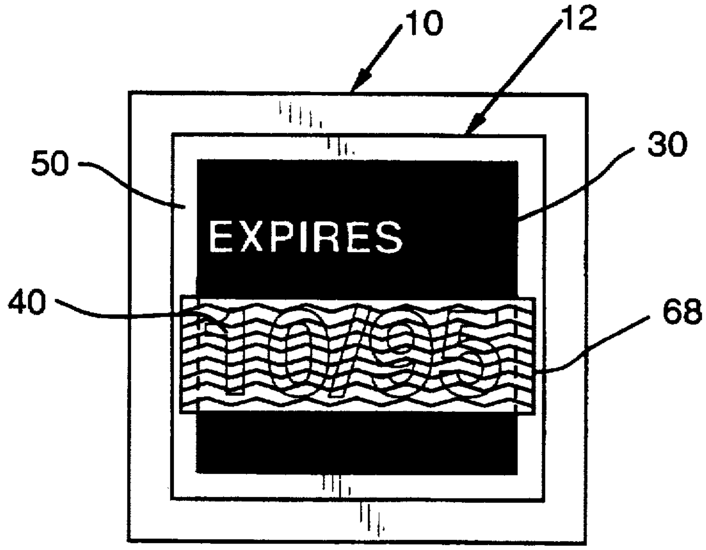
FIG. 7 is an elevational view of an alternate embodiment of the informational article showing the hologram.

If desired, and as shown in FIG. 7, a hologram 68 can be placed on top of the background overprint 30. The variable information 40 is then written over the hologram 68 and then the transparent tape 50 secured over the variable information 40 as was discussed above. The hologram 68, as is known, protects the informational article from unauthorized duplication. It can be metallized (either fully or zone metallized), partially demetallized, or clear with a high refractive index coating. The hologram 68 can be a separate label or a hot stamp foil which is preferably applied to the background overprint 30 before the variable information is inserted into the zone to be protected 12. Alternatively, the hologram 68 can be integrated into the write resistant layer 58 or the tape 50. It will be appreciated that the variable information 40 can be written on the hologram 68, as shown in FIG. 7 or the hologram 68 can be placed in an area which is not to be written on. It may be preferred to use the latter positioning of the hologram 68 in order to make the informational article 10 easier to reuse, as it would be difficult to reuse (legally) the hologram 68 once it has been written on. It will be further appreciated that the hologram 68 does not affect the way the invention works (as will be explained below) however, removal of the tape 50 will most likely change the hologram 68 (especially if it is a foil) which can also be an indication of tampering.

Figure 8:
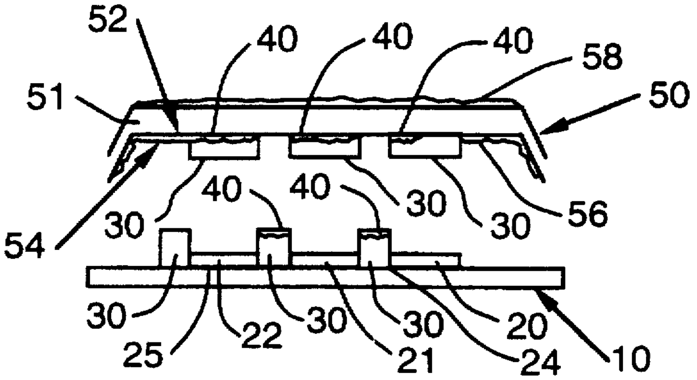
FIG. 8 is a cross-sectional view similar to FIG. 6 only showing the tape being removed from the informational article.
Figure 9:
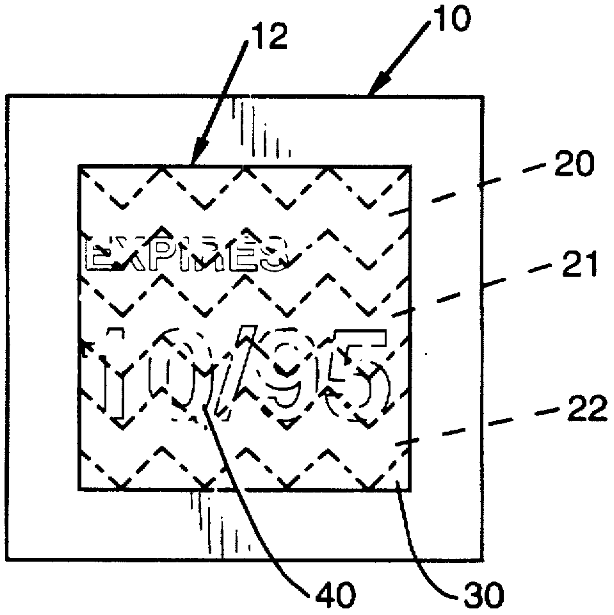
FIG. 9 is an elevational view showing the informational article after the tape is removed therefrom.

Referring now more particularly to FIGS. 5, 6 and 8, 9, it will be shown what happens when the transparent tape 50 is removed. It will be appreciated that, in accordance with the invention, the transparent tape 50 is more strongly adhered to the information receiving layer 30 than the information receiving layer 30 is adhered to the separation control materials 20–22. As can be seen in FIG. 8, removal of the tape 50 also removes both (i) the information receiving layer 30 and (ii) the information 40 overlying the separation control materials 20–22. In this way, the information overlying the separation control material is removed from the remainder of the information 40 which was absorbed into the information receiving layer 30. As can be seen in FIG. 9, this provides immediate, easily, visually detectable evidence that the tape 50 has been removed and thus the informational article tampered with. It will be appreciated that "filling in" the missing portions of the variable information 40 shown in FIG. 9 would be extremely difficult. In order to accomplish this, the background overprint 30 color would have to be matched and the remaining portion of variable information would have to be altered in order to change the expiration date. Furthermore, if a hologram 68 is used, the hologram 68 would have to be replaced.

As mentioned above, the substrate is preferably a contrasting color to the background overprint 30. As will be appreciated in viewing FIG. 9, the color of the areas overlying the separation control materials 20–22, once the tape 50 is removed taking with it a portion of the background overprint, will contrast to the remainder of the background overprint 30 remaining on the informational article that contains the remnants of the variable information 40. In this way, tamper evidence is even more readily, visually, detectable.

It will be appreciated that an informational article and an associated method has been provided, the informational article being alteration and duplication resistant as well as having a tamper evident indicating feature. The invention is especially suitable for use in association with informational articles having substrates made of plastic, metal, non-fibrous material and tightly bound fibrous articles which contain variable information.

While specific embodiments of the invention have been disclosed, it will be appreciated by those skilled in the art that various modifications and alterations to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An informational article including a substrate having a surface, said article comprising:

a separation control material disposed on a portion of said surface;

an information receiving layer overlying at least a portion of said separation control material and overlying at least a portion of said surface of said substrate, said information receiving layer receiving a marking material in the form of information to be included on said informational article;

a transparent tape adhesively bonded to said information receiving layer containing said information and said substrate;

said transparent tape being more strongly adhered to said information receiving layer than said information receiving layer is adhered to said separation control material so that removal of said transparent tape from said article removes both (i) said information receiving layer and (ii) said marking material in the form of said information overlying said separation control material from the remainder of said information receiving layer and said marking material in the form of said information, whereby evidence of tampering is visually detectable; and said separation control material is selected from the group consisting of dimethyl silicones, alkyl modified silicone fluids, paraffins and tetrafluorothylene.

2. The informational article of claim 1, wherein said information receiving layer absorbs said marking material so that said marking material is permanently marked onto said layer.

3. The informational article of claim 2, wherein said information receiving layer is an opaque ink.

4. The informational article of claim 1, wherein a hologram disposed on said information receiving layer of said informational article.

5. The informational article of claim 4, wherein said hologram is metallized.

6. The informational article of claim 4, wherein said hologram is partially demetallized.

7. The informational article of claim 4, wherein said hologram has a clear high refractive index coating thereon.

8. The informational article of claim 1, wherein said transparent tape has an exposed surface.

9. The informational article of claim 8, wherein said exposed surface includes a write resisting layer.

10. The informational article of claim 9, wherein said write resisting layer is made of a write resisting material which includes a silicone resin and a wax.

11. The informational article of claim 10, wherein said transparent tape includes a pressure sensitive adhesive.

12. The informational article of claim 1, wherein said substrate is made of a material selected from the group consisting of plastic, metal, non-fibrous material and tightly bound fibrous material.

13. The informational article of claim 1, wherein said surface has a first color and said information receiving layer has a second color, said first color being a contrasting color to said second color.

* * * * *